Jan. 6, 1970   R. G. SWANSON   3,487,683
SUCTION GAUGE
Filed Sept. 27, 1968

INVENTOR
ROLF G. SWANSON
BY
ATTORNEY

United States Patent Office 3,487,683
Patented Jan. 6, 1970

3,487,683
SUCTION GAUGE
Rolf G. Swanson, Minneapolis, Minn., assignor to The Torit Corporation, Ramsey County, Minn., a corporation of Minnesota
Filed Sept. 27, 1968, Ser. No. 763,078
Int. Cl. G01m *19/00;* G01l *19/12*
U.S. Cl. 73—168                                7 Claims

ABSTRACT OF THE DISCLOSURE

A suction gauge includes a channel-shaped member designed to guide a tubular member connected to a source of suction toward a horizontal plane, upon movement longitudinal of the channel. A ball is supported on the horizontal plane and is moved by suction in the tubular member. When the end of the tubular member is sufficiently close to the ball, the ball will be drawn into the tubular member.

---

Figure 1:
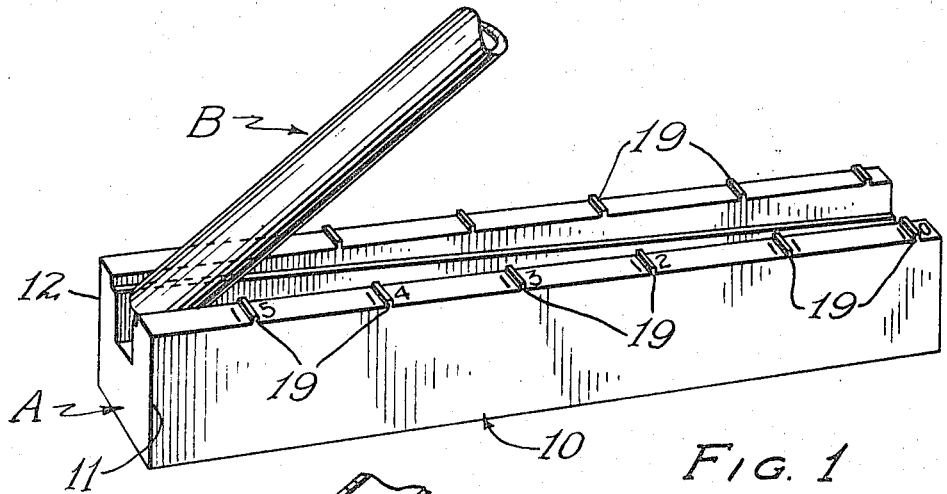

This invention relates to an improvement in suction gauges and deals particularly with a device for testing the pickup value or ability of a vacuum device.

Vacuum devices of various types are commonly used. Vacuum cleaners are found in the majority of homes. More recently, similar suction creating devices have been used in conjunction with oral evacuators in dental offices. The purpose of such devices is to pick up liquid, blood, tooth chips and the like from the mouth while the dentist is at work.

There is no simple and effective means of determining the "pick up value or ability" of the device. As the purpose of such devices is to pick up and transport fluid and particles, a measurement of the amount of vacuum present does not provide a true picture of the efficiency of the device. A small displacement pump may provide a near perfect vacuum, but would be of little value as a vacuum cleaner or oral evacuator. It is an object of the present invention to provide a simple and effective device for measuring the pick up value of a vacuum device capable of providing an accurate comparison between such devices.

An object of the present invention resides in the provision of a simple device for measuring the pick-up ability of a vacuum line, which may be used by a person unskilled in the field. Due to its simplicity, it can be produced at low cost. At the same time, the device provides an accurate comparison between the pick-up ability of various devices, such as different types of vacuum cleaners. In the following description, the operation of the device will be described in conjunction with oral evacuators; but it will be understood that any vacuum line may be tested by attaching to the line a tubular member such as an evacuator tip of a predetermined bore size.

A feature of the present invention resides in the provision of a channel-shaped member having a pair of inclined flanges on the opposed inner surfaces of the sides of the trough. These flanges provide opposed shelves which gradually incline toward the base of the trough. A metal ball is placed on the base of the trough at the point where the shelves are at a maximum distance from the base of the channel. A tip such as an evacuator tip is secured to the vacuum line by a flexible hose, the evacuator tip having a bevelled end which may rest squarely upon the opposed shelves on opposite sides of the trough. When the suction is turned on, the evacuator tip is slowly moved down the inclined shelves, the force of the suction rolling the metal ball along the base of the trough. When the evacuator tip is near enough to the ball, the ball will be drawn into the evacuator tip and conducted through the hose to the collector. By noting the position of the evacuator tip when the ball is drawn into the tip, a determination of the pick-up value or ability is provided.

A feature of the present invention resides in the provision of a device of the type described in which the channel-shaped member is provided with gauge marks on one or both of the sides to provide an indication of the point at which the ball is picked up. By noting the position of the evacuator tip relative to the gauge marks, a determination of the amount of suction in the tip may be indicated. If, over a period of time, it is found necessary to move the tip farther down the inclined shelves before the ball is picked up, a reduction in the suction is indicated.

These and other objects and novel features of the present invention will be more clearly and fully set forth in the following specification and claims.

Figure 2:
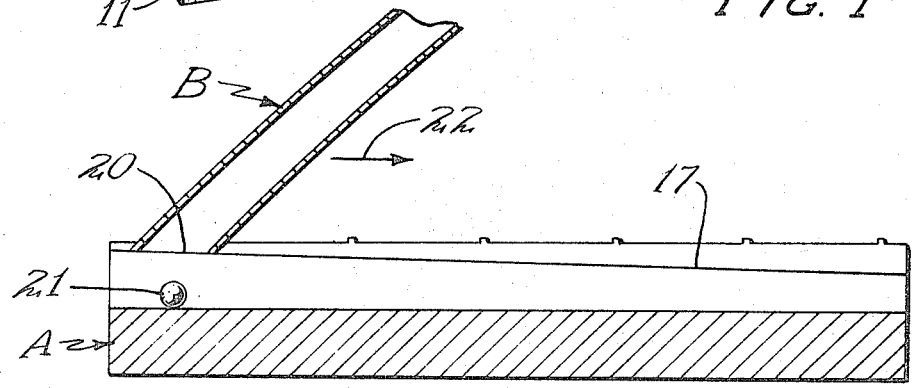
Figure 3:
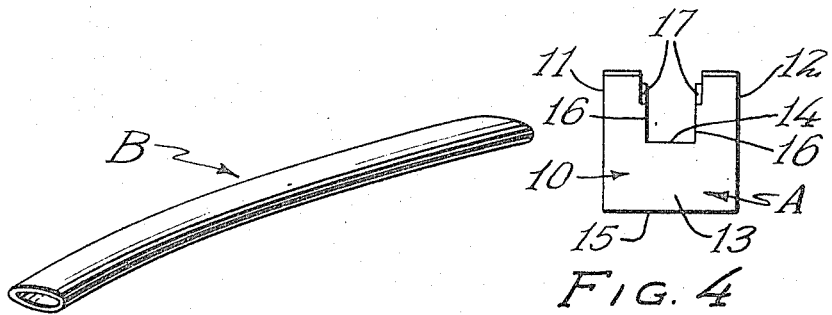
Figure 4:
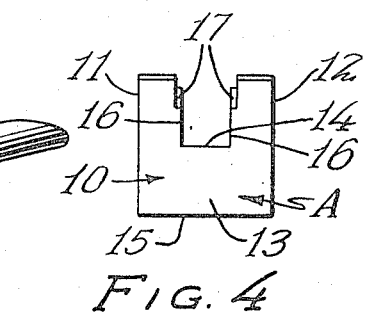

In the drawings forming a part of the specification.
FIGURE 1 is a perspective view of the test gauge in readiness for use.
FIGURE 2 is a vertical section taken on a longitudinal plane through the device.
FIGURE 3 is a perspective view of the evacuator tip which is used in conjunction with the device.
FIGURE 4 is an end elevational view of the device.

The test device is indicated in general by the letter A, and is used in conjunction with an evacuator tip which is indicated in general by the letter B. It will be understood, that the evacuator tip B is attached to a hose leading to the dental evacuator. As such dental evacuators are well known in the art, such a device is not shown.

The test device A includes a channel-shaped body 10 which, as illustrated in FIGURE 4 of the drawings includes a pair of upright parallel sides 11 and 12 which are connected by a base portion 13. The base surface 14 which is the upper surface of the base 13 is parallel to the bottom surface 15 of the channel. In other words, when the channel 10 is resting upon a flat horizontal surface, the surface 14 will also be on a horizontal plane.

Flanges 16 are provided on the inner opposed surfaces of the channels 5, 11, and 12. These flanges 16 thus present inclined shelves 17 along their upper surfaces which are relatively high on one end and relatively low at the other end. As an example, the shelves 17 may be slightly more than a quarter of an inch above the level of the raised surface 14 at one end of the channel, and about $15/16$ of an inch from the base 14 at the other end of the channel. Obviously, these dimensions can vary with the size of the ball used as well as the weight of the ball.

Gauge marks 19 are provided in equally spaced relation along the upper surfaces of the channel sides 11 and 12. The gauge marks are provided to more readily determine the position of the evacuator tip B when the ball is picked up. Indicia may be provided which may give a true measure of the pick-up value or ability or may be merely numbers for comparison purposes.

The evacuator tube B is provided with a bevelled end 20 which is on a common plane, and which may rest squarely upon the shoulders 17. The evacuator tip is connected to the tube of the evacuator in the same manner as the tip usually used in the patient's mouth. The evacuator tube B is of proper dimensions to fit between the sides of the channels 11 and 12. The ball 21 which is used in conjunction with the device is a steel ball of the type used in ball bearings and the like. In the particular arrangement illustrated, the ball 21 is about $3/16$ of an inch in diameter. The evacuator tip illustrated is perhaps $7/16$ of an inch in outside diameter.

In operation, the ball 21 is placed upon the base surface 14 of the channel 10 at the end of the channel where the flanges 16 are tallest. The evacuator tip B is extended into the channel, and the flat undersurface 20 of the tip is extended into the channel, and the flat undersurface 20 of the tip is rested squarely upon the shoulders 17. The evacuator tip B is then moved slowly to the right as indicated by the arrow 22. The suction created by the evacuator will cause the ball 21 to be drawn along the base until the suction created is sufficient to draw the ball 21 into the tip B. As soon as the ball is drawn upwardly, the movement of the tip B is stopped and the position of the tip is estimated relative to the gauge marks. In the particular arrangement illustrated, if the tip B moves past the indicator mark 19 which reads 1.2, the evacuator system may be considered to have subnormal efficiency.

It will be noted that the device is so simple that it can be operated by anyone with normal intelligence, and all that is required is that the channel be set on a level plane, and that the evacuator tip be attached to the evacuator hose. The entire operation can be accomplished in an extremely short period of time, so that the effectiveness of the evacuator may be tested daily if desired so that any reduction in suction may be diagnosed immediately.

Similarly the device may be used to demonstrate the effectiveness of various types or styles of such device. The shape of the tip may be varied, as long as the same type of tip is used for the various comparison tests. The gauge marks 19 may represent a proportionate measure of the vertical height of pick-up in inches or millimeters.

In accordance with the patent statutes, I have described the principles of construction and operation of my improvement in evacuator gauge, and while I have endeavored to set forth the best embodiment thereof, I desire to have it understood that changes may be made without departing from the spirit of my invention.

I claim:
1. A suction testing device including:
   a channel-shaped member having a base and opposed upwardly extending sides,
   flanges on the inner opposed surfaces of said opposed sides, said flanges being tapered in height from one end of said sides to the other,
   a tubular tip having, an end adapted to rest upon the upper surfaces of said flanges,
   a ball of smaller diameter than the internal diameter of said tubular tip adapted to roll upon the upper surface of said channel base.

2. The structure of claim 1 and in which said end of said tubular tip is on a common plane and bevelled.

3. The structure of claim 1 and including gauge marks on said channel sides spaced longitudinally thereof.

4. The structure of claim 1 and in which said ball comprises a metal ball.

5. The method of determining the suction in a tubular member through the use of means for guiding the tubular member gradually toward a horizontal plane, the method consisting in,
   placing a rollable member on the horizontal plane beneath the tubular member,
   withdrawing air through the tubular member,
   moving the end of said tubular member along said guiding means and moving said rollable member by suction beneath the end of said tubular member,
   the suction in said tubular member drawing said rollable member into said tubular member when said members are sufficiently close, and
   noting the position of said tubular member when said rollable member is drawn into the same.

6. A suction testing device including:
   means providing a horizontal plane,
   inclined guide means extending upwardly from said horizontal plane,
   a tubular member connected to a source of partial vacuum,
   a ball adapted to rest upon said horizontal plane beneath the end of said tubular member when said tubular member is resting upon said guide means, whereby
   when said tubular member is moved along said guide means, said ball will be moved along said plane until it is drawn into said tubular member by the suction in said tubular member.

7. The structure of claim 3 and in which the gauge marks are spaced to represent a proportionate measure of the vertical height of pick-up distance in inches, millimeters and the like.

References Cited

UNITED STATES PATENTS 3,401,555   9/1968   McMeekin _____ 73—209 XR
3,417,728   12/1968   Kinner _____ 116—70

LOUIS R. PRINCE, Primary Examiner

WILLIAM A. HENRY, II, Assistant Examiner

U.S. Cl. X.R.
116—70; 302—58